United States Patent [19]
Yuasa

[11] Patent Number: 5,978,801
[45] Date of Patent: Nov. 2, 1999

[54] CHARACTER AND/OR CHARACTER-STRING RETRIEVING METHOD AND STORAGE MEDIUM FOR USE FOR THIS METHOD

[75] Inventor: Natsuki Yuasa, Tokyo, Japan

[73] Assignee: Sharp Kabushiki Kaisha, Osaka, Japan

[21] Appl. No.: 08/972,456

[22] Filed: Nov. 18, 1997

[30] Foreign Application Priority Data

Nov. 21, 1996 [JP] Japan ................................ 8-311108
Sep. 11, 1997 [JP] Japan ................................ 9-247052

[51] Int. Cl.$^6$ .................................................. G06F 17/30
[52] U.S. Cl. .............................. 707/6; 707/3; 707/514; 707/529; 707/530; 345/348; 345/349; 345/350; 382/181; 382/227; 382/228; 382/229; 382/232
[58] Field of Search ........................ 707/514, 529, 707/530, 6, 3; 345/348, 349, 350; 382/232, 229, 228, 227, 181

[56] References Cited

U.S. PATENT DOCUMENTS

| | | | |
|---|---|---|---|
| 5,379,420 | 1/1995 | Ullmer | 395/600 |
| 5,495,409 | 2/1996 | Kamo | 364/184 |
| 5,511,159 | 4/1996 | Baker et al. | 395/161 |
| 5,761,686 | 6/1998 | Boomberg | 707/529 |
| 5,764,974 | 6/1998 | Walster et al. | 707/6 |
| 5,765,176 | 6/1998 | Bloomberg | 707/514 |
| 5,778,356 | 7/1998 | Heiny | 707/2 |
| 5,778,359 | 7/1998 | Stent | 707/4 |
| 5,835,100 | 11/1998 | Matsufusa | 345/467 |

OTHER PUBLICATIONS

Aho, et al. "Compilers, principles, techniques and tools," Lexical Analysis (1986) pp. 134–144 and corresponding English translation.

Primary Examiner—Anton Fetting
Assistant Examiner—Jean M. Corrielus

[57] ABSTRACT

A character and/or character-string retrieving method with retrieves a plurality of patterns at a time by using a single deterministic finite automaton prepared from a plurality of different patterns. There is also a method for optimizing the number of states for the above-mentioned retrieving method, and a storage medium having records of programs and data necessary for executing the above-mentioned character and/or character-string retrieving and a state number optimizing method. A plurality of regular expressions $r_1, r_2, \ldots, r_n$ to be simultaneously retrieved by pattern matching are prepared, and then augmented to form an augmented regular expression $((r_1)\#_1)|((r_2)\#_2)| \ldots ((r_n)\#_n)$. A deterministic finite automaton is constructed so that it treats states including positions corresponding to $\#_1, \#_2, \ldots$, n, thereby simultaneously retrieving a plurality of regular expression patterns by distinguishing matches from one another.

15 Claims, 11 Drawing Sheets

AUGMENTED REGULAR EXPRESSION:
( ( (1|2)/(1|2) )#1) | ( ( (1|2) : (1|2) )#2)

FIG.9

STATE 1 : {1,2,7,8}

STATE 2 : {3,9}

STATE 3 : {4,5}

STATE 4 : {10,11}

STATE 5 : {6}

STATE 6 : {12}

FIG.10

| STATE NUMBER | INPUT SYMBOL | | | |
|---|---|---|---|---|
| | 1 | 2 | / | : |
| 1 | 2 | 2 | | |
| 2 | | | 3 | 4 |
| 3 | 5 | 5 | | |
| 4 | 6 | 6 | | |
| 5 | | | | |
| 6 | | | | |

FIG.11

STATE 1 : {1,2,7,8} INITIAL STATE
STATE 2 : {3,9}
STATE 3 : {4,5}
STATE 4 : {10,11}
STATE 5 : {6} ACCEPTING STATE 1
STATE 6 : {12} ACCEPTING STATE 2

FIG.12

| STATE NUMBER | INPUT SYMBOL | | | |
|---|---|---|---|---|
| | 1 | 2 | / | : |
| 1 | 2 | 2 | | |
| 2 | | | 3 | 4 |
| 3 | 5 | 5 | | |
| 4 | 6 | 6 | | |

5 : ACCEPTING STATE 1
6 : ACCEPTING STATE 2

FIG.13

AUGMENTED REGULAR EXPRESSION:
((a)#1)|((abb|a*bb*)#2)

FIG.14

STATE 1 : {1,3,6,7}

STATE 2 : {2,4,6,7}

STATE 3 : {8,9}

STATE 4 : {6,7}

STATE 5 : {5,8,9}

FIG.15

| STATE NUMBER | INPUT SYMBOL | |
|---|---|---|
| | a | b |
| 1 | 2 | 3 |
| 2 | 4 | 5 |
| 3 | | 3 |
| 4 | 4 | 3 |
| 5 | | 3 |

FIG.16

STATE 1 : {1,3,6,7} INITIAL STATE

STATE 2 : {2,4,6,7} ACCEPTING STATE 1

STATE 3 : {8,9} ACCEPTING STATE 2

STATE 4 : {6,7}

STATE 5 : {5,8,9} ACCEPTING STATE 2

FIG.17

| STATE NUMBER | INPUT SYMBOL | |
|---|---|---|
| | a | b |
| 1 | 2 | 3 |
| 2 : ACCEPTING STATE 1 | 4 | 5 |
| 3 : ACCEPTING STATE 2 | | 3 |
| 4 | 4 | 3 |
| 5 : ACCEPTING STATE 2 | | 3 |

FIG.18

STATE 1: NON-ACCEPTING = PREVIOUS INITIAL
         STATE 1         STATE 1  STATE
STATE 2: ACCEPTING      = PREVIOUS
         STATE F₁         STATE 2
STATE 3: ACCEPTING      = PREVIOUS
         STATE F₂         STATE 3,5
STATE 4: NON-ACCEPTING  = PREVIOUS
         STATE 2          STATE 4

FIG.19

| STATE NUMBER | INPUT SYMBOL | |
|---|---|---|
| | a | b |
| 1 | 2 | 3 |
| 2 : ACCEPTING STATE 1 | 4 | 3 |
| 3 : ACCEPTING STATE 2 | | 3 |
| 4 | 4 | 3 |

FIG.20

AUGMENTED REGULAR EXPRESSION:
( ( (1|2)/(1|2) )# ) | ( ( (1|2) : (1|2) )# )

CHARACTER AND/OR CHARACTER-STRING RETRIEVING METHOD AND STORAGE MEDIUM FOR USE FOR THIS METHOD

BACKGROUND OF THE INVENTION

The present invention relates to a character and/or character-string retrieving method and more particularly to a character and/or character-string retrieving method that can be applied in a key-information extracting device for extracting key information (e.g., date and time) from, e.g., a document and an electronic mail, a document summarizing device for summarizing document data and filing systems of a document processing device, word processor and PDA (personal digital and assistant devices).

A method for retrieving (pattern matching) a character-string by using a finite automaton has been studied and a representative algorithm has been described in detail in "<Compilers, principles, techniques and tools>, A. V. Aho, R. Sethi and J. D. Ullman, Addison-Wesley Publishers Limited, 1986".

A conventional algorithm will be briefly explained as follows:

There's a flow of procedures on how to prepare a conventional deterministic finite automaton.

In the flow, a pattern r of a regular expression desired to be retrieved by pattern matching is first prepared and an augmented regular expression (r)# is then formed from the prepared regular expression.

A syntax tree T of the augmented regular expression is prepared (by using a method described in detail in the above-mentioned document <Compilers, principles, techniques and tools>), according to which a set of states and a state-transition table are prepared. Among states in a set, a state including a position corresponding to a marker # are considered as an accepting state.

There's a flow of procedures how to optimize the number of states of the prior art deterministic finite automaton.

An initial partition $\Pi$ of a set of states is constructed of two groups: accepting states and non-accepting states.

A new partition $\Pi_{new}$ is constructed from the partition $\Pi$ by splitting each group into subgroups (i.e., if a state "s" in a group "a" goes to a state in a group "b" on a character and/or character-string input (M) but any other state "t" in a group "a" goes to a state out of the group "b" on the same character and/or character-string input (M), the group "a" must be split into two subgroups so that one subgroup contains the state "s" and the other contains the state ("t"). This process of splitting groups in the current partition is repeated until no more groups can be to split. A final partition $\Pi_{final}$ is thus obtained.

A deterministic finite automaton (DFA) M' having the optimized number of states is formed from the final partition $\Pi_{final}$.

As described above, matching of any character-string by using the prior art finite automaton with only one accepting state was intended to determine whether pattern matching of that character-string would succeeded or not. It was not necessary to determine what pattern matched the character-string. Consequently, when retrieving a plurality of various kinds of patterns separate automatons must be prepared and used for retrieval of a plurality of different patterns respectively.

SUMMARY OF THE INVENTION

In view of the above-mentioned problems involved in the prior art, the present invention was made to provide a character and/or character-string retrieving method which is capable of simultaneously retrieving a plurality of various kinds of patterns by means of a deterministic finite automaton formed from multiple kinds of patterns and which makes it possible to simultaneously retrieve a plurality of patterns by using an optimized number of states, and a storage medium for recording programs and data necessary for performing the character and/or character-string retrieving method.

An object of the present invention is to provide a character and/or character-string retrieving method for simultaneously retrieving a plurality of specific patterns of characters and/or character-strings from objects to be searched, which comprises preparing a plurality $(2, \ldots, n)$ of regular expressions $r_1, r_2, \ldots, r_3$ of a plurality $(2, \ldots, n)$ of characters and/or character-strings to be searched on a character-by-character and/or a string-by-string basis, preparing an augmented regular expression $(r_1)\#_1, (r_2)\#_2, \ldots, (r_n)\#_n$ by cocatenating end-markers $\#_1, \#_2, \ldots, \#_n$ to the regular expressions $r_1, r_2, \ldots, r_n$ respectively, preparing a syntax $((r_1)\#_1)|((r_2)\#_2)|\ldots|((r_n)\#_n)$ based on the augmented regular expression and constructing a deterministic finite automaton for retrieving a plurality of patterns of characters and/or character-strings by distinguishing from one another by simultaneously applying patterns of characters and/or character-strings contained in the regular expressions $r_1, r_2, \ldots, r_n$ to an object to be retrieved and by setting states with $\#_1, \#_2, \ldots, \#_n$ as accepting states $1, 2, \ldots, n$ respectively.

Another object of the present invention is to provide a character and/or character-string retrieving method for simultaneously retrieving a plurality of specific patterns of characters and/or character-strings from objects to be searched, which comprises preparing a plurality $(2, \ldots, n)$ of regular expressions $r_1, r_2, \ldots, r_3$ of a plurality $(2, \ldots, n)$ of characters and/or character-strings to be searched on a character-by-character and/or a string-by-string basis, preparing an augmented regular expression $(r_1)\#, (r_2)\#, \ldots, (r_n)\#$ by cocatenating a end-marker # to the regular expressions $r_1, r_2, \ldots, r_n$ respectively, preparing a syntax $((r_1)\#)|((r_2)\#)|\ldots|((r_n)\#)$ based on the augmented regular expression and constructing a deterministic finite automaton for retrieving a plurality of patterns of characters and/or character-strings by distinguishing from one another by simultaneously applying patterns of characters and/or character-strings contained in the regular expressions $r_1, r_2, \ldots, r_n$ to objects to be retrieved and by setting accepting states $1, 2, \ldots, n$ which positions correspond to positions #.

Another object of the present invention is to provide a character and/or character-string retrieving method which is based on the method above-mentioned and characterized in that a set of states {State 1, State 2, ... } and a state-transition table on the set of states are prepared from a syntax based on the augmented regular expression and patterns of characters and/or character-strings contained in the multiple regular expressions are applied for simultaneously retrieving a plurality of character and/or character-string patterns.

Another object of the present invention is to provide a character and/or character-string retrieving method which is based on the above-mentioned method and characterized in that the number of states in the set of states is optimized by partitioning the set into groups $F_1, F_2, \ldots, F_n$ according to kinds of states corresponding to the accepting states $1, 2, \ldots, n$ so that a total of groups in a final partition is equal to (n+1) where n is the number of accepting states and 1 shows one non-accepting state.

Another object of the present invention is to provide a character and/or character-string retrieving method which is based on the above-mentioned method and characterized in that each group "a" of the (n+1) groups of states is further split into groups until a state "s" and any other state "t" in a group "a" goes to a state in a group "b" on an input of the same character and/or character-string (M), and a state transition table is rewritten according to a final partition obtained.

A further object of the present invention is to provide a storage medium in which has been stored a program and data readable by a computer for executing retrieval of a character and/or character-string by the character and/or character-string retrieving method mentioned in anyone above.

PREFERRED EMBODIMENT OF THE INVENTION

Prior to explaining preferred embodiments of the present invention, a conventional character and/or character-string retrieving method and storage medium, will be described below as references for the present invention.

A method for retrieving (pattern matching) a character-string by using a finite automaton has been studied and a representative algorithm has been described in detail in "<Compilers, principles, techniques and tools>, A. V. Aho, R. Sethi and J. D. Ullman, Addison-Wesley Publishers Limited, 1986".

Figure 1:
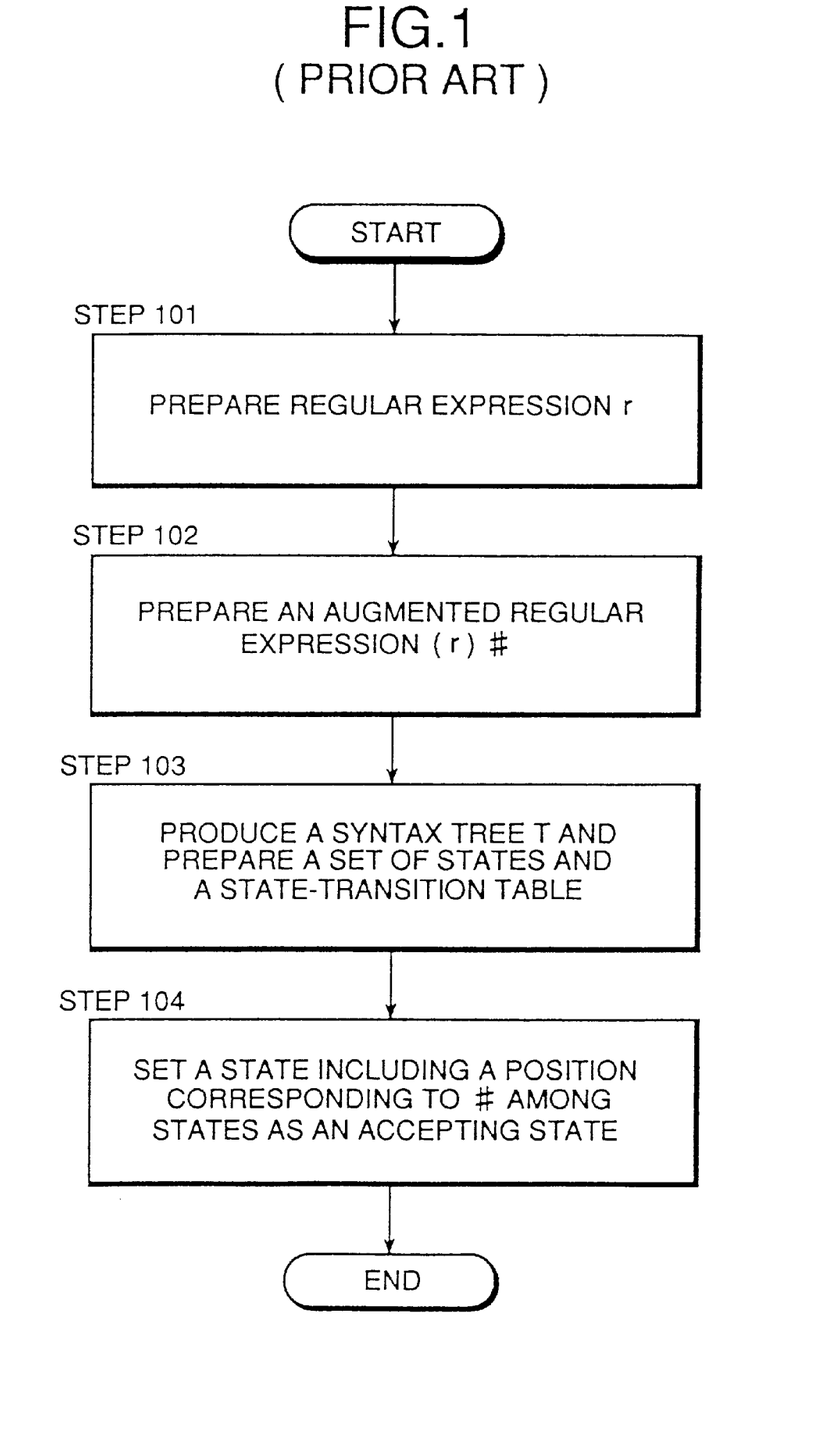
FIG. 1 is a flowchart describing a procedure of preparing a deterministic finite automaton in prior art.

Referring to flowcharts shown in FIGS. 1 and 2 (attached to this specification and made according to the description in the above-mentioned document), a conventional algorithm will be briefly explained as follows:

FIG. 1 is a flowchart describing how to prepare a conventional deterministic finite automaton.

In FIG. 1, a pattern r of a regular expression desired to be retrieved by pattern matching is first prepared (Step 101) and an augmented regular expression (r)# is then formed from the prepared regular expression (Step 102).

A syntax tree T of the augmented regular expression is prepared (by using a method described in detail in the above-mentioned document <Compilers, principles, techniques and tools>), according to which a set of states and a state-transition table are prepared (Step 103). Among states in a set, a state including a position corresponding to a marker # are considered as an accepting state (Step 104).

Figure 2:
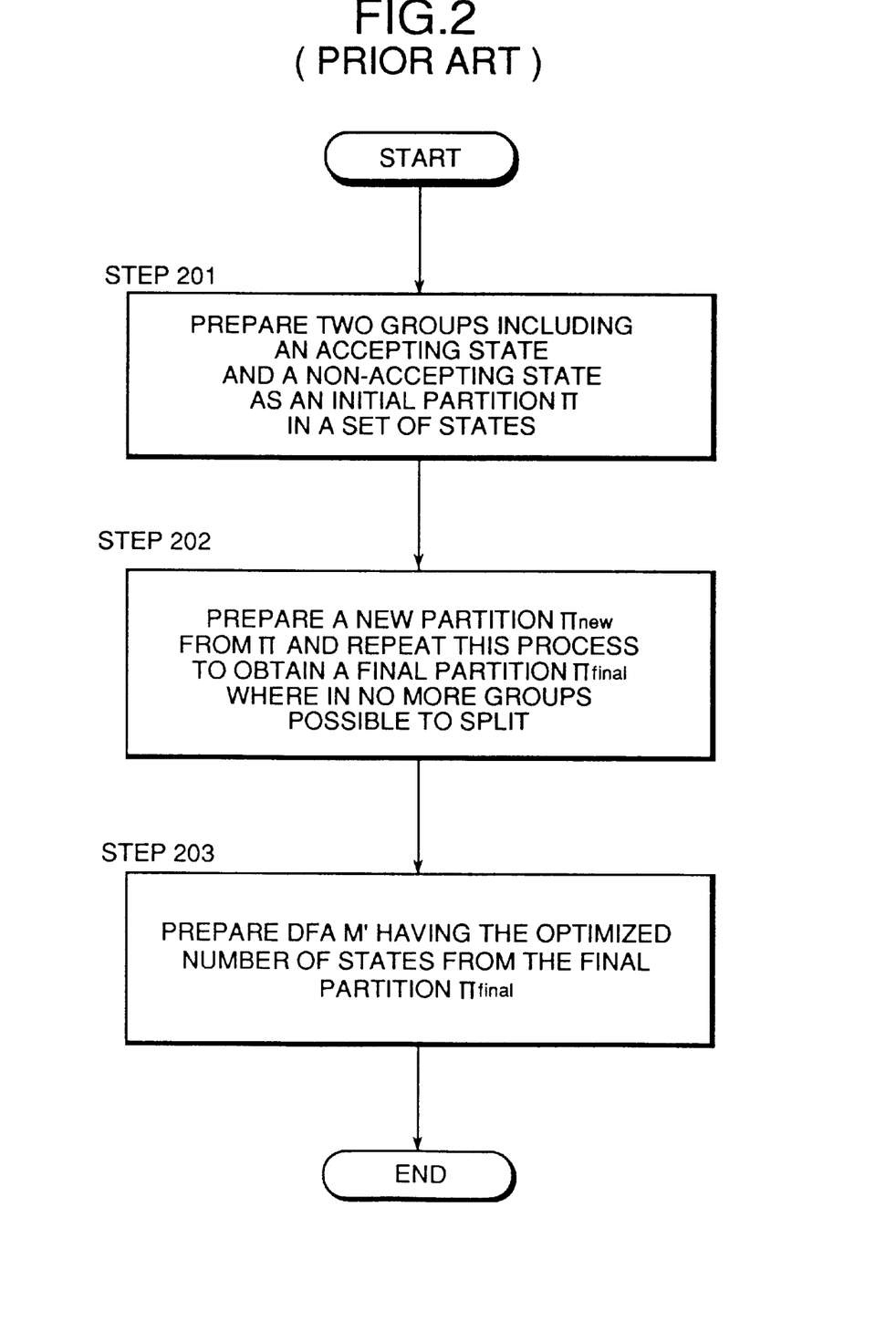
FIG. 2 is a flowchart describing a procedure of optimizing the number of states of a deterministic finite automaton in prior art.

FIG. 2 is a flowchart describing how to optimize the number of states of the prior art deterministic finite automaton.

In FIG. 2, an initial partition Π of a set of states is constructed of two groups: accepting states and non-accepting states (Step 201).

A new partition $\Pi_{new}$ is constructed from the partition Π by splitting each group into subgroups (i.e., if a state "s" in a group "a" goes to a state in a group "b" on a character and/or character-string input (M) but any other state "t" in a group "a" goes to a state out of the group "b" on the same character and/or character-string input (M), the group "a" must be split into two subgroups so that one subgroup contains the state "s" and the other contains the state "t") This process of splitting groups in the current partition is repeated until no more groups possible to split. A final partition $\Pi_{final}$ is thus obtained (Step 202).

A deterministic finite automaton (DFA) M' having the optimized number of states is formed from the final partition $\Pi_{final}$ (Step 203).

Figure 3:
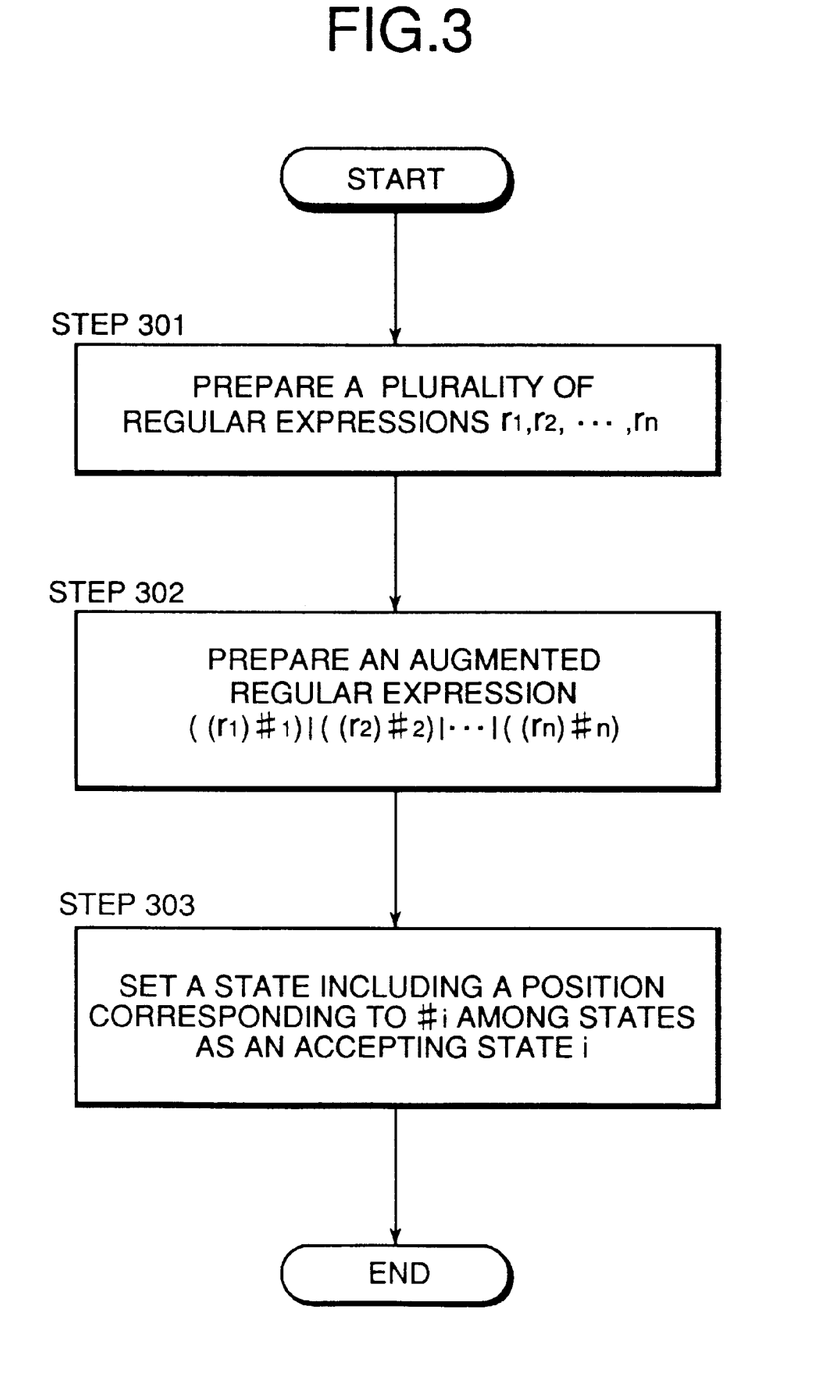
FIG. 3 is a flowchart describing a procedure of preparing a deterministic finite automaton according to the present invention.

Now, a method for constructing the deterministic finite automaton (DFA) according to the present invention is described by a flowchart of FIG. 3.

Initially, a plurality of regular expressions $r_1, r_2, \ldots$, to be matched at a time is prepared (Step 301). An augmented regular expression $((r_1)\#_1)|((r_2)\#_2)| \ldots |((r_n)\#_n)$ is then formed (Step 301). Among states, those including positions corresponding to $\#_1, \#_2, \ldots \#_n$ are made to be accepting states 1, 2, ... n (Step 303).

Figure 4:
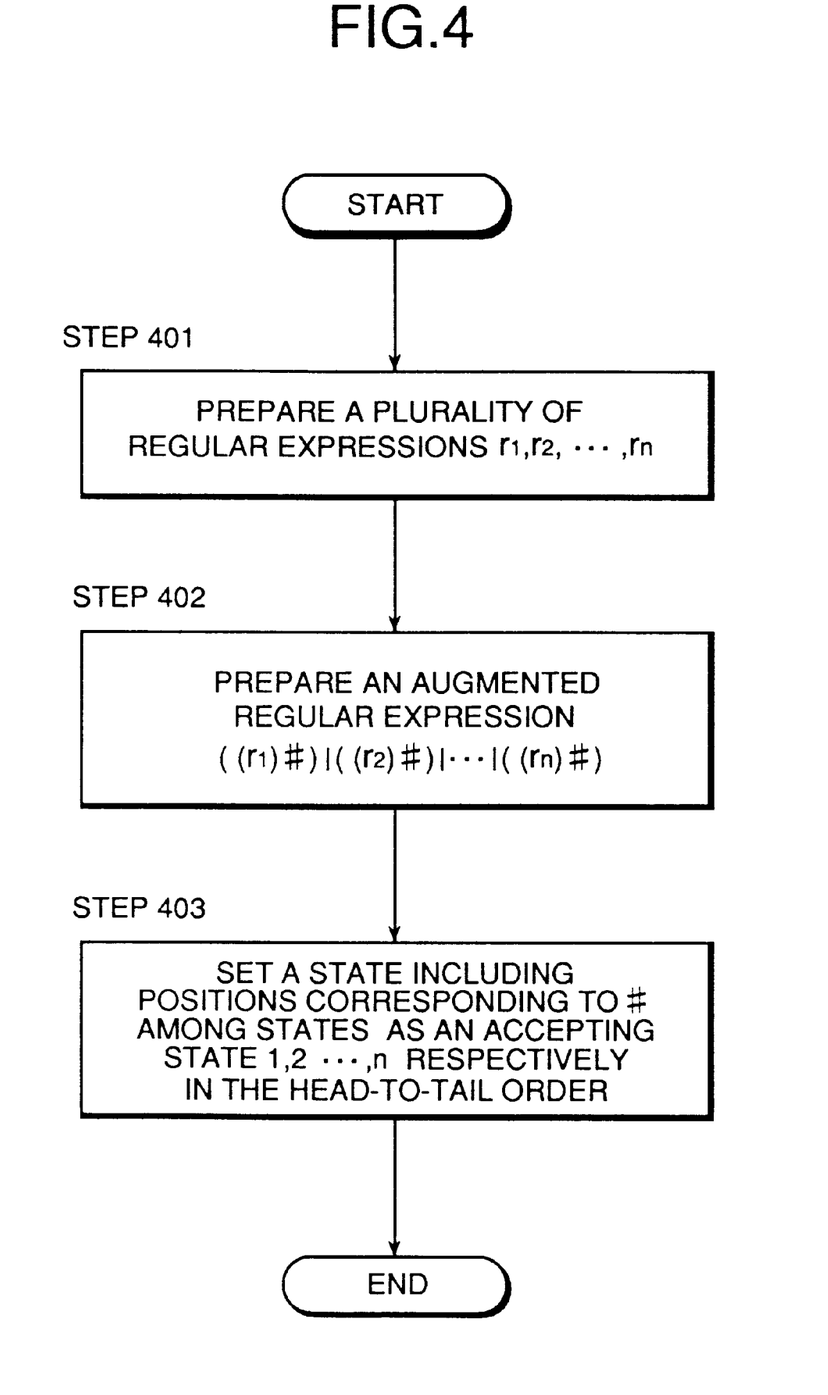
FIG. 4 is a flowchart describing another procedure of preparing a deterministic finite automaton according to the present invention.

Another method for constructing the deterministic finite automaton (DFA) according to the present invention is described by a flowchart of FIG. 4. Initially, a plurality of regular expressions $r_1, r_2, \ldots {}_n$ to be matched at a time is prepared (Step 401). An augmented regular expression $((r_1)\#)|((r_2)\#)| \ldots |((r_n)\#)$ are then formed (Step 402). Among states, each of those including positions corresponding to # are made to be accepting state 1, 2, ... n respectively in the head-to-tail order (Step 403).

Figure 5:
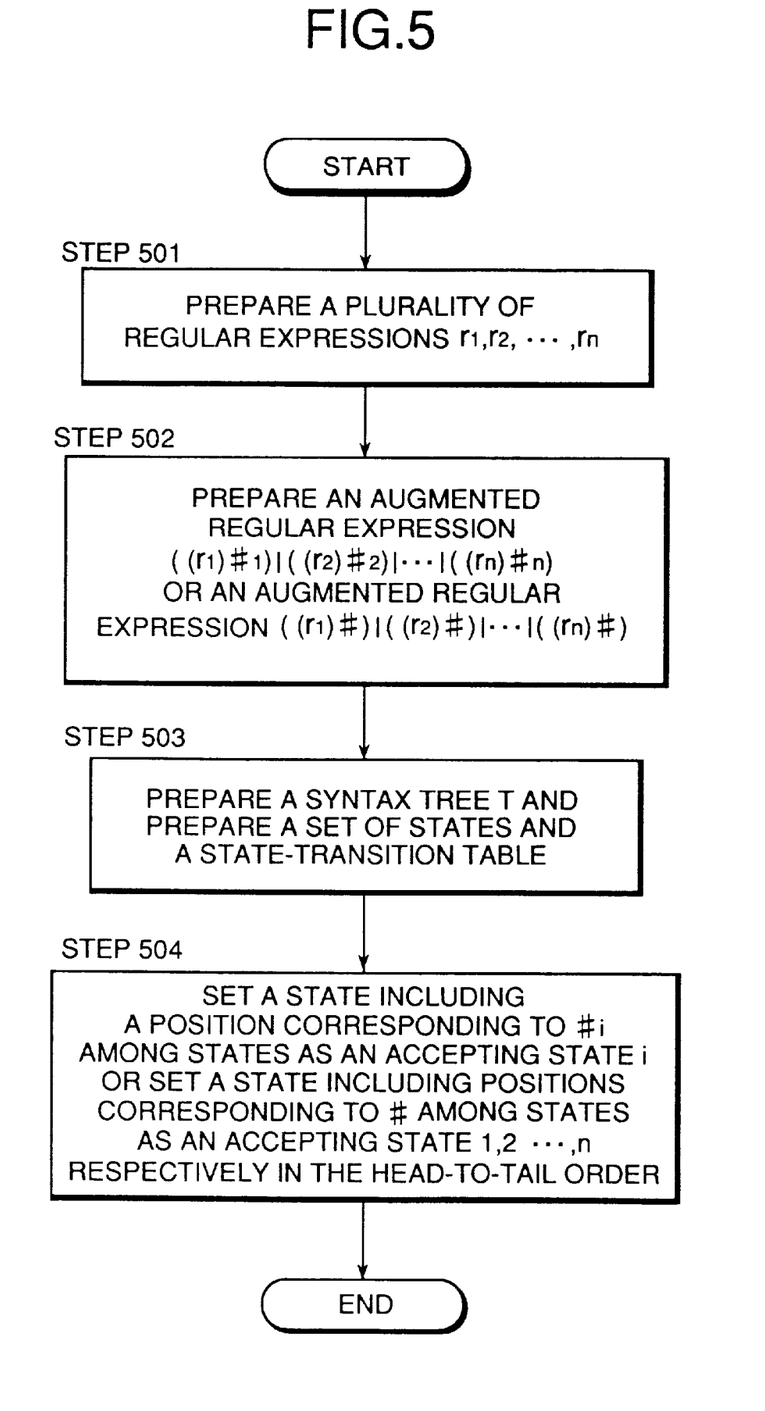
FIG. 5 is a flowchart describing another procedure of preparing a deterministic finite automaton according to the present invention.

Another method for constructing the deterministic finite automaton (DFA) according to the present invention is described by a flowchart of FIG. 5. Initially, a plurality of regular expressions $r_1, r_2, \ldots r_n$ to be matched at a time is prepared (Step 501). An augmented regular expression $((r_1)\#_1)|((r_2)\#_2)| \ldots |((r_n)\#)$ or an augmented regular expression $(r_1)\#)|((r_2)\#)| \ldots |((r_n)\#)$ is then prepared (Step 502). A syntax tree T of the augmented regular expression is made and a set of states and a state-transition table are prepared by using the syntax tree T (Step 503). Among states, those including positions corresponding to $\#_1, \#_2, \ldots \#_n$ are regarded as accepting states 1, 2, ... n in the case of using the former augmented regular expression, while those including positions corresponding to # are regarded as accepting states 1, 2, ... n in the head-to-tail order in the case of using the latter augmented regular expression (Step 504).

Figure 6:
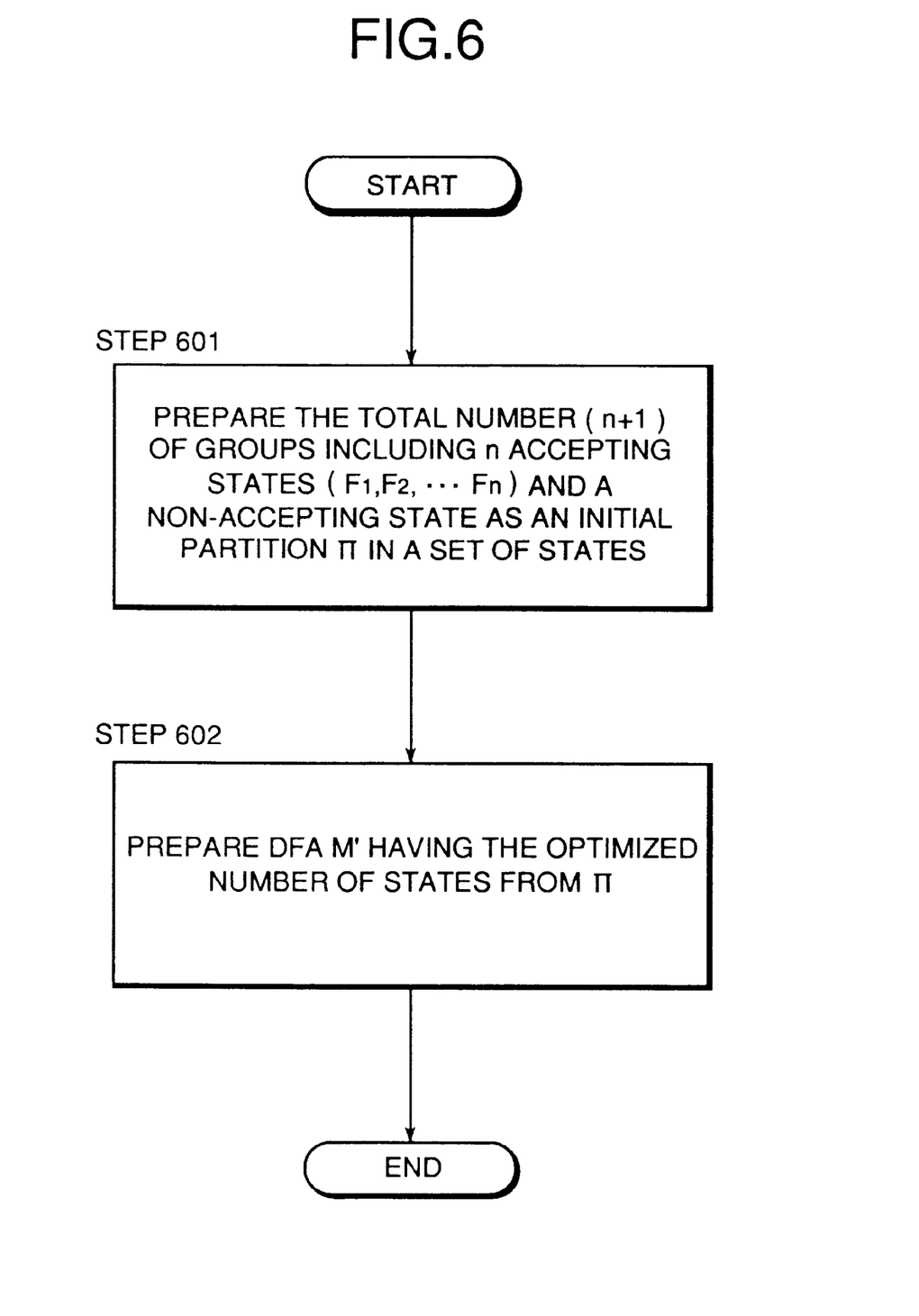
FIG. 6 is a flowchart describing a procedure of optimizing the number of states of a deterministic finite automaton according to the present invention.

Another method for constructing the deterministic finite automaton (DFA) according to the present invention is described by a flowchart of FIG. 6. (n+1) groups including n groups of accepting states $(F_1, F_2, \ldots, F_n)$ and a group of non-accepting states are formed in an initial partition Π (Step 601). A deterministic finite automaton M' is obtained from the partition Π by optimizing the number of states (Step 602).

Figure 7:
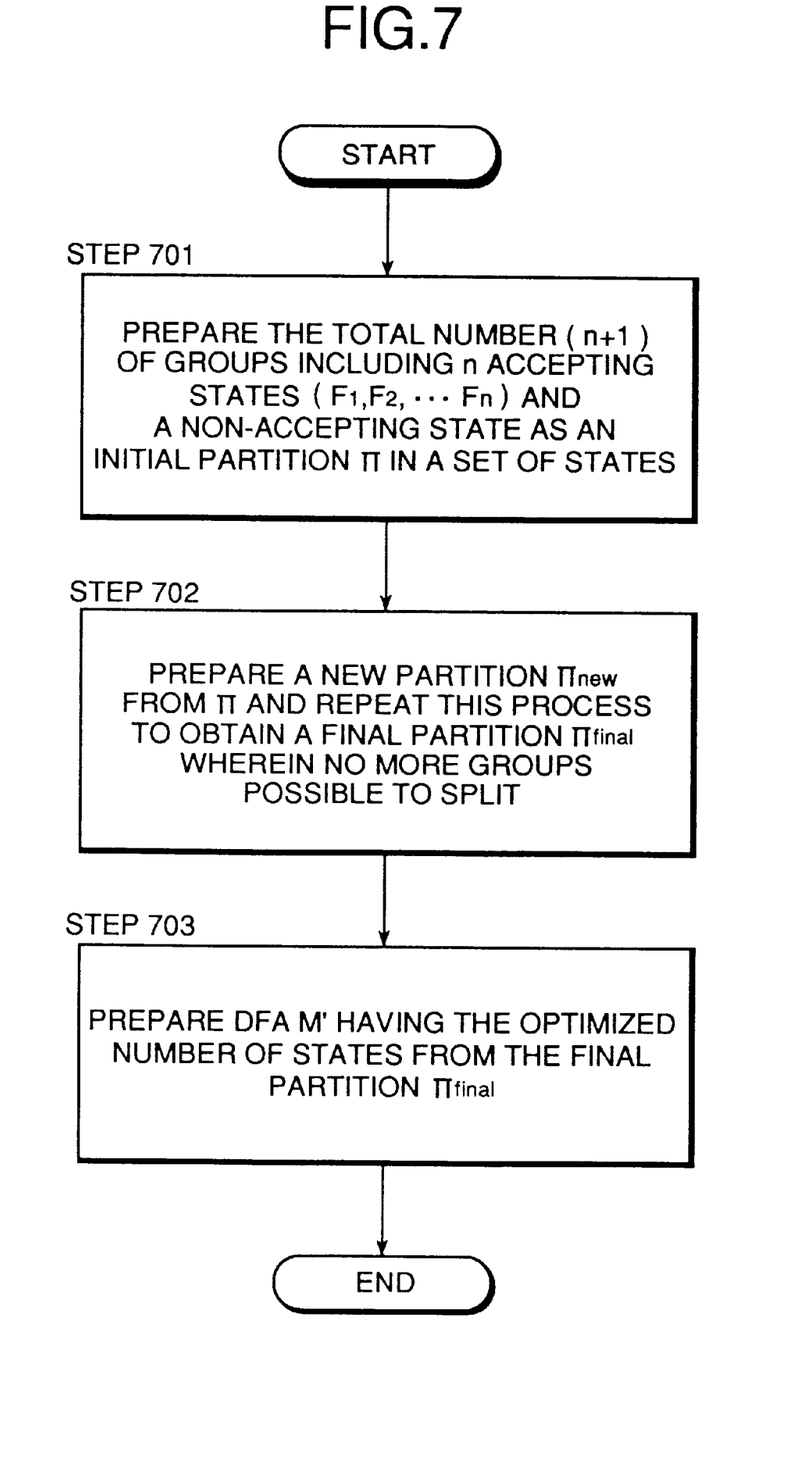
FIG. 7 is a flowchart describing another procedure of optimizing the number of states of a deterministic finite automaton according to the present invention.

Another method for constructing the deterministic finite automaton (DFA) above-mentioned is described by a flowchart of FIG. 7. A first partition Π of a set of states is made to form (n+1) states consisting of n accepting states $(F_1, F_2, \ldots F_n)$ and a non-accepting state (Step 701). A new partition $Π_{new}$ is formed in current partition Π. This process of splitting groups in the current partition is repeated until no more groups possible to be split. A final partition $Π_{final}$ is thus obtained (Step 702). A deterministic finite automaton (DFA) having an optimized number of states is formed from the final partition $Π_{final}$ (Step 703).

A storage medium has a recorded therein program and data that is readable by a computer for executing retrieval of a character and/or character-string by the character and/or character-string retrieving method defined in any one of claims. The storage medium may be in practice, for example, a ROM (read only memory), flash memory, floppy disk, hard disk, magneto-optical disk, CD-ROM and so on. A character and/or character-string retrieving device reads a necessary program and data from the storage medium and executes retrieval of characters and/or character-strings by using the read program and data.

By reffering to the exemplified embodiments herein after described, detail of the present invention will be apparent.

FIG. 5 describes a procedure of preparing a deterministic finite automaton (DFA) according to the present invention. As shown in FIG. 5, a plurality of regular expressions $r_1, r_2, \ldots r_n$ to be matched in pattern at a time is first prepared (Step 501). Next, an augmented regular expression $((r_1)\#_1)|((r_2)\#_2)| \ldots |((r_n)\#_n)$ is prepared (Step 502). For example, a syntax tree T of the augmented regular expression is formed and a set of states and a state-transition table are prepared by using that syntax tree T (Step 503). Among states, those including positions corresponding to $\#_1, \#_2, \ldots \#_n$ are regarded as accepting states 1, 2, ... n (Step 504).

The thus constructed DFA has a plurality of accepting states in the partitions and can instantly determine what regular expression pattern matches with a retrieved pattern by detecting what accepting state the retrieval reached to.

In this specification, "Symbol" is synonymous with "Character."

[Embodiment 1]

The above-mentioned procedure will be described further in detail for an exemplified practical case that two following patterns of regular expressions should be distinguished from each other and retrieved at a time. (This stage corresponds to Step 501 of FIG. 5).

Pattern 1: "(1|2)/(1|2)"

Pattern 2: "(1|2):(1|2)"

Figure 8:
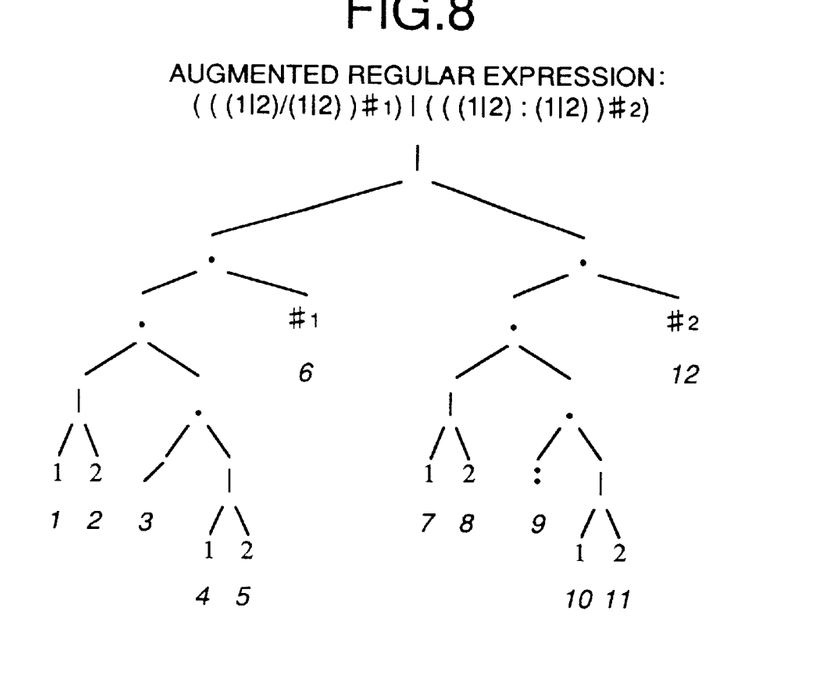
FIG. 8 is illustrative of a syntax tree of an augmented regular expression according to a first embodiment of the present invention.
Figure 9:
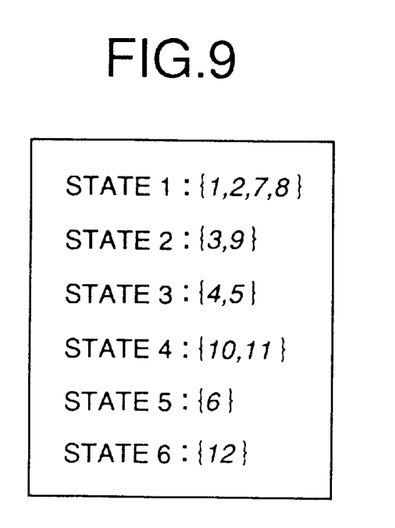
FIG. 9 illustrates a set of states of an augmented regular expression according to the first embodiment of the present invention.

At Step 502, the regular expressions are augmented as follows: $(((1|2)/(1|2))\#_1)|(((1|2):(1|2))\#_2)$ A syntax tree for the above-mentioned augmented regular expression is constructed as shown in FIG. 8. A set of states (FIG. 9) and a state transition table (FIG. 10) are prepared according to the syntax (at Step 503 of FIG. 5). In FIG. 8, the positions of leaves in the syntax tree are numbered from 1 to 12. In FIG. 9, a set of states numbered from 1 to 6 indicates a corresponding set of the positions of leaves in the syntax tree.

Among the states, a state represented by firstpos (root) is a start state. This state shows a set of positions of leaves corresponding a first symbol in a sequence of symbols ({1, 2, 7, 8} in the shown example) generated in the syntax tree. Accordingly, state 1 is the start state in the shown case.

Figure 11:
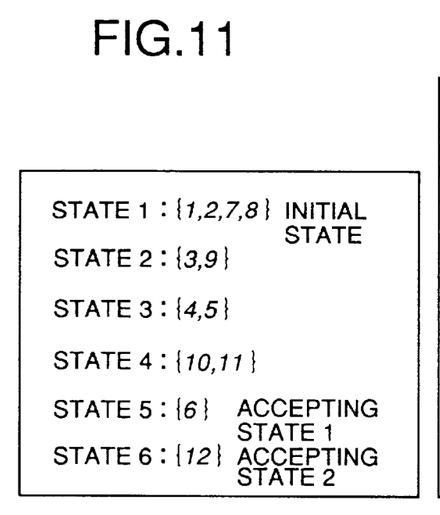
FIG. 11 is illustrative of additions of an initiating state and an accepting state to a set of states of an augmented regular expression of FIG. 9 according to the first embodiment of the present invention.
Figure 12:
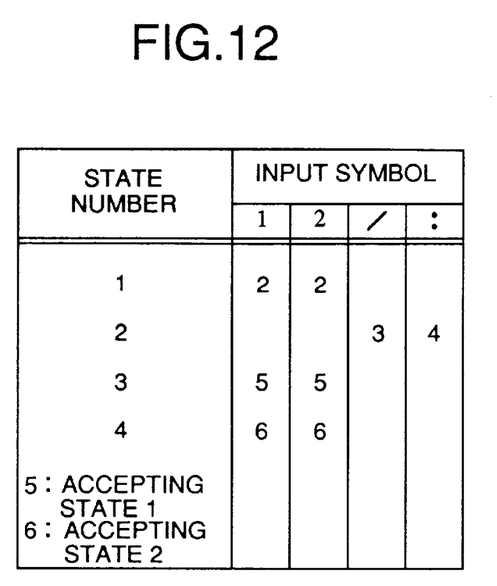
FIG. 12 is illustrative of additions of an initiating state and an accepting state to a transition table of an augmented regular expression of FIG. 10 according to the first embodiment of the present invention.

Among states, those including the positions associated with the end-marker #i are the accepting state i. Consequently, a final set of states is shown in FIG. 11 and a final transition table is shown in FIG. 12 (at Step 504 of FIG. 5). In the transition table (FIG. 12), blanks mean that pattern matching stops without accepting, i.e., the pattern matching of a character-string was failed. The stop without accepting also occurs if any input character (e.g., "3") that is absent in the transition table appeared.

Pattern matching of the following character-string is now carried out by using the transition table shown in FIG. 12.

01/231:258

The process begins at State 1, which is the start state. Referring to the transition table, State 1 goes to State 2 on an input symbol "1" or "2". Otherwise matching ends in failure. In the shown example, the first input is "0" resulting in matching failure.

Next, the process advances to a next symbol "1" in the string and begins at State 1 (start state) again. In this time, State 1 goes to State 2 on the input of "1". According to the transition table, State 2 goes to State 3 on an input of "/" and then State 3 goes to State 5 on an input of "2" in the string. Since State 5 is an accepting state 1, the matching of the character-string succeeded in retrieving a pattern 1 in this position. Namely, a portion (1/2) from the position of the input symbol "1" in the start state 1 to the position of the input symbol "2" is matched with the pattern 1.

Since State 5 may end up mismatching on any input, the process advances the input position at the just-preceding start state by one to a next input position ("/" in the shown example). However, in case of ignoring a character-string to be overlapped with the already pattern-matched portion ("1/2" in the shown case), the input position is set at a position advanced by one from the position of a symbol on which the state went to the accepting state (i.e., "3 in the fifth position from the top of the character-string in the shown example). The same rule will be applied in a further process.

In the former case (without skipping), State 1 on an input of "/" results in mismatching. The process advances to a next input position "2" and begins at State 1 again. State 1 goes to State 2 on an input of "2". State 2 ends in mismatch on an input of "3". The process returns to State 1 and advances the input position by one to a next position ("3" in the shown example) from the position at the preceding start state. State 1 ends in mismatching with the input of "3" and the process returns to State 1.

Then, State 1 goes to State 2 on an input of "1" according to the transition table. State 2 goes to State 4 on a next input of ":". State 4 goes further to State 6 on a next input of "2".

As State 6 is an accepting state 2, the matching of the character-string succeeded the retrieval of a pattern 2 in this position. Namely, a portion (1:2) from the position of the input symbol "1" in the start state 1 to the position of the input symbol "2" is matched with the pattern 2.

Since State 6 may end in mismatching on any input, the process advances the input position at the just-preceding start state by one to a next input position (":" in the shown example). State 1 with an input of ":" results in mismatching. The process advances to a next input position "2" and begins at State 1.

State 1 goes to State 2 on an input of "2". State 2 ends in mismatch on a next input of "5". The process returns to State 1. The input position is advanced by one to a next position ("5" in the shown example) from the position at the preceding start state. State 1 ends in mismatching with the input of "5" and the process returns to State 1.

The process returns to State 1. The input position is advanced by one to a next input position ("8" in the shown example) from the position at the preceding start state. State 1 ends in mismatching with the input of "8". At this time, all characters in the string are read in and therefore the process ends.

As can be apparent from the foregoing, once an input character-string was read-in at a time, all patterns (pattern 1 and pattern 2) therein may be retrieved by distinguishing the patterns from one another.

In the above-described example, two accepting states were defined to further cause mismatching with any input symbol. For some patterns of regular expressions, it is, however, possible to define each accepting state to have a following transition on a certain input symbol. In this case, State after attaining a matched result may continue transition (without returning to the start state) until the next accepting state is obtained. Namely, a plurality of patterns (of different lengths) could be retrieved by a process from the same start position.

If patterns of the longest length are desired to be retrieved, an entire string of input characters is read at on time. Additionally, only patterns of accepting states obtained just before mismatching are output (i.e., only the last of accepted states with no mismatching interposed therebetween is regarded to attain a successful pattern matching). This may occur in the following instance.

[Embodiment 2]

The following two patterns of regular expressions are supposed to be retrieved separately at a time (Step 501 of FIG. 5).

Pattern 1: "a"

Pattern 2: "(abb)|(a*bb*)"

At Step 502 in FIG. 5, these two patterns are augmented at Step 502 to obtain the following augmented regular expression:

$((a)\#_1)|(((abb)|(a*bb*))\#_2)$

Figure 13:
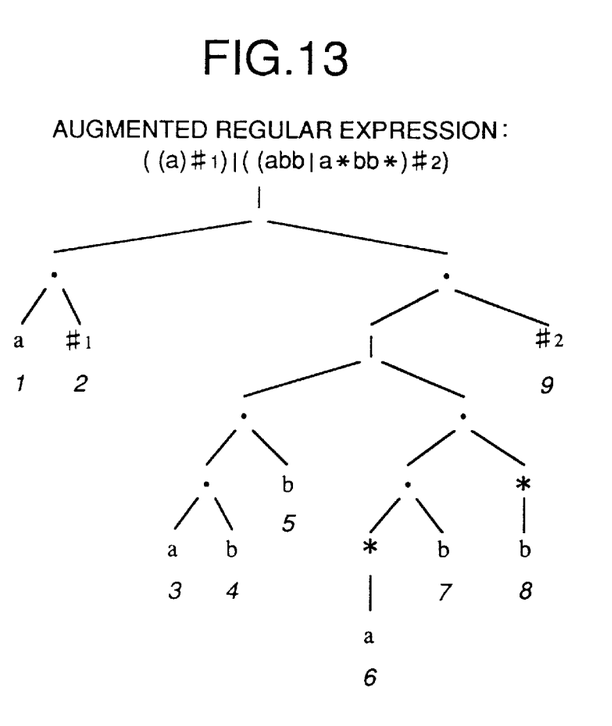
FIG. 13 is illustrative of a syntax tree of an augmented regular expression according to a second embodiment of the present invention.
Figure 14:
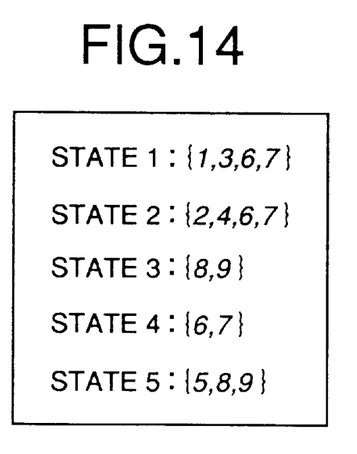
FIG. 14 illustrates a set of states of an augmented regular expression according to the second embodiment of the present invention.
Figure 15:
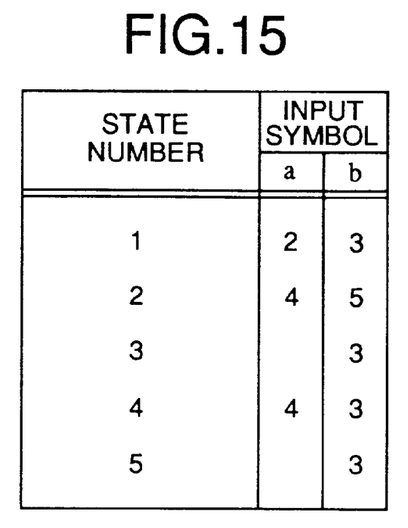
FIG. 15 illustrates a transition table of an augmented regular expression according to the second embodiment of the present invention.

A syntax tree for this augmented regular expression is formed as shown in FIG. 13, a set of states is prepared as shown in FIG. 14, and a state transition table is prepared on the basis of the syntax tree as shown in FIG. 15 (at Step 503).

Among states, a state represented by firstpos (root) is a start state. This state shows a set of positions corresponding to a first symbol in a sequence of symbols ({1, 3, 6, 7} in the shown example) generated in the syntax tree.

Figure 16:
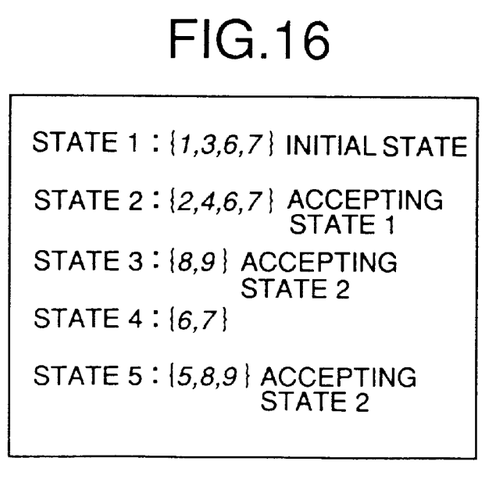
FIG. 16 is illustrative of additions of an initiating state and an accepting state to a set of states of an augmented regular expression of FIG. 14 according to the second embodiment of the present invention.
Figure 17:
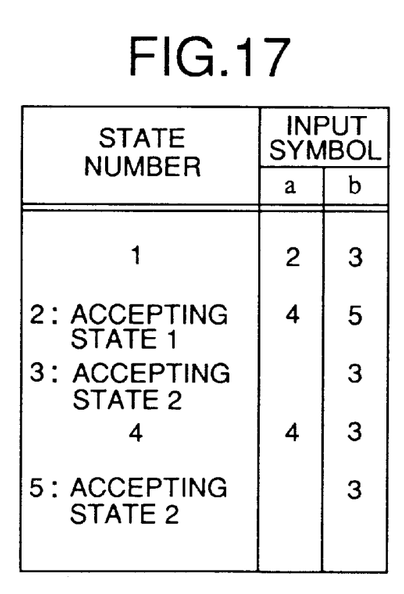
FIG. 17 is illustrative of additions of an initiating state and an accepting state to a transition table of an augmented regular expression of FIG. 15 according to the second embodiment of the present invention.

Among states, those including the positions associated with the end-marker #i are the accepting state i. Consequently, a final set of states are as shown in FIG. 16 and a final transition table are as shown in FIG. 17 (at Step 504 of FIG. 5). In the state transition table, blanks mean that pattern matching stops without accepting, i.e., the pattern matching of a character-string was failed. The stop without accepting also occurs if any input character (e.g., "c") not indicated in the transition table appeared.

Pattern matching of the following character-string is now conducted by using the transition table shown in FIG. 17.

"aabbb"

The process begins at State 1 that is the start state. Referring to the transition table, State 1 goes to State 2 on an input symbol "a" or "b". Otherwise matching ends in failure. In the shown example, the State 1 goes to State 2 on a first input of a symbol "a". Since the State 2 is an accepting State 1, a character-string "a" from the start state is matched with the pattern 1.

Next, the process advances to a proceeding input symbol "a" of the string. According to the transition table, State 2 goes to Step 4 on the input symbol "a".

State 4 then goes to State 3 on a next input symbol "b" Since the State 3 is an accepting State 2 , a character-string "aab" from the start state is matched with the pattern 2.

The process advances to a next input symbol "b" in the character-string. At this time, State 3 goes to State 3 on the input of "b" according to the transition table. Since State 3 is the accepting State 2, a character-string "aabb" from the start state is matched with the pattern 2.

The process advances to a next input symbol "b" in the character-string. State 3 goes to State 3 on the input symbol "b" according to the transition table. Since State 3 is the accepting State 2, a character-string "aabbb" from the start state is matched with the pattern 2.

The character-string has been read. All pattern-matched characters can be outputted as a" in the pattern 1 and "aab", "aabb" and "aabbb" in the pattern 2.

The longest one of the pattern-matched strings beginning from the same start position can be extracted by outputting the last one of pattern-matched strings, which is obtained in an accepted state just before mismatching or after reading the whole character-string. As shown, only the string "aabbb" is extracted as the pattern 2.

[Embodiment 3]

The embodiment 1 uses an augmented regular expression with end-markers ($\#_1, \#_2, \ldots, \#_n$), whilst the embodiment 3 uses the following augmented regular expression with an end-marker # (with no suffix) (at Step 502 of FIG. 5).

(((1|2)/(1|2))#|(((1|2):(1|2)#)

Figure 10:
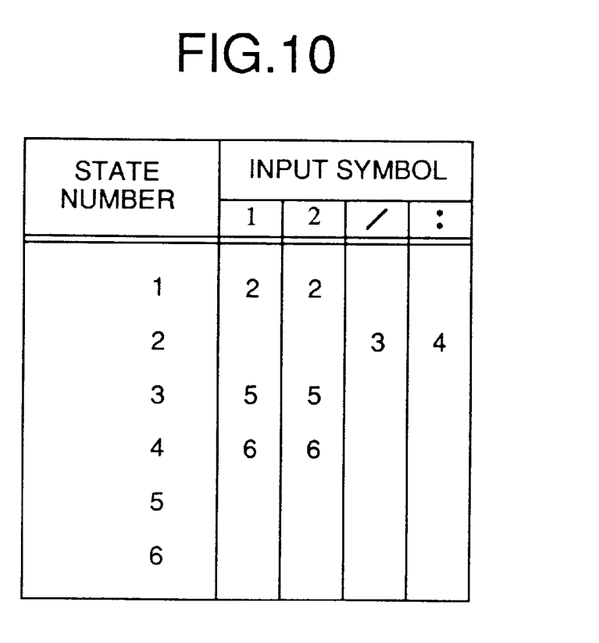
FIG. 10 illustrate s a transition table of an augmented regular expression according to the first embodiment of the present invention.
Figure 20:
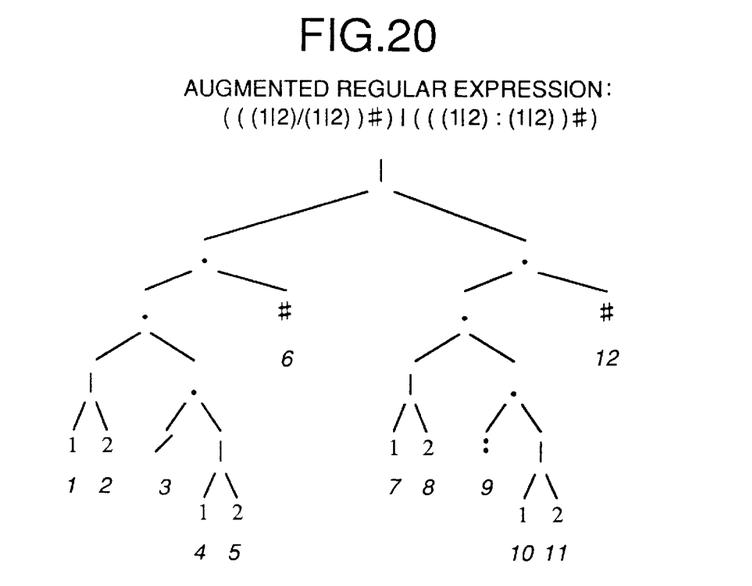
FIG. 20 is illustrative of a syntax tree of an augmented regular expression according to a third embodiment of the present invention.

A syntax tree for this augmented regular expression is formed as shown in FIG. 20 and a set of states and a transition table are prepared by using the syntax tree as shown in FIG. 9 and FIG. 10 respectively (at Step 503). Among states, a state represented by firstpos (root) is a start state. This state shows a set of positions corresponding to a first symbol in a sequence of symbols ({1, 2, 7, 8} in this example) generated in the syntax tree. Accordingly, state 1 is the start state in the shown case.

Among states, those including the positions associated with the end-marker # are the accepting state 1 and the accepting state 2 in the head-to-tail order. Consequently, a final set of states and a final transition table are as shown in FIG. 11 and FIG. 12 respectively (at Step 504 of FIG. 5).

The results of experiments for determining processing speeds obtainable according to the present invention are as follows:

Experiment Circumstances:
  Sun SPARCstation 10
  Compile by gcc-O
  Objects to be retrieved
  100 documents
Total storage capacity: 382,458 bytes
An example of documentation (a part) is:
  "The 5th Study Meeting of Foundations of Retrieval"
  Date : June 26 (Friday)
  Time limit for application of presenting a research paper: March 17
  Method for application for presenting a research paper:
    Please fill out an application blank and send it to the following address by Email, Facsimile or Mail.
    Zip code: 261,
    Nakase 1-9-2, Mihama-ku, Chiba City, Japan
    SHARP CORPORATION
    Image and Media Laboratories
    Phone: (043) 299-xxxx, FAX: (043)299-yyyy
    E-mail: natch @ iml.mkhar.sharp.co.jp
Example of regular expressions
  A leading part of "patterns for retrieving a date" is as follows: (((((January)|(February)|(March)|(April)|(May)|(June)|(July)|(August)|(September)|(October)|(November)|(December))|((Jan)|(Feb)|(Mar)|(Apr)|(May)|(Jun)|(Jul)|(Aug)|(Sep)|(Oct)|(Nov)|(Dec)))[ ]*(([1-9])|(1[0-9])|(2[0-9])|(3[0-1])|(0[1-9]))[ ]*(-[ ]*(([1-9])|(1(1[0-9])|(2[0-9])|(3[0-1])|(0[1-9]))[ ]*)?[, ][ ]*((1[0-9][0-9]0-[0-9])|( 2[0-9][0-9][0-9])|((')?[7-9][0-9])|((')?6[5-9])))|((((SUN)|(Sun)|(MON)|(Mon)|   (TUE)|(Tue)|(WED)|(Wed)|(THU)|(Thu)|(FRI)|(Fri)|(SAT)|(Sat))|((sun)|(mon)|(tue)|(wed)|(thu)|(fri)|(sat)))[ ](((January)|(February)|(March) (April)|(May)|(June)|(July)|(August)|(September)|(October)|(November)|(December))|((Jan)|(Feb)|(Mar)|(Apr)|(May)|(Jun)|(Jul)|(Aug)|(Sep)|(Oct)|(Nov)|(Dec)))[ ](([1-9])|(1(1[0-9])|(2[0-9])|(3[0-1])|0[1-9]))) . . .

Time for Retrieving by using DFA:

| Regular Expressions | Retrieving Time |
|---|---|
| Date Retrieving Pattern | 3 seconds |
| Time Retrieving Pattern | 1 second |
| Email Address Retrieving Pattern | 3 seconds |
| URL Retrieving Pattern | 1 second |
| Price Retrieving Pattern | 1 second |

-continued

| Regular Expressions | Retrieving Time |
|---|---|
| Telephone Number Retrieving Pattern | 1 second |
| A pattern for Retrieving all of the above-mentioned items | 5 seconds |

As shown in above Table, a total time taken for separately retrieving all the above-mentioned regular expressions was 10 seconds (by prior art) but it could be saved to 5 seconds by simultaneously retrieving all patterns according to the present invention.

FIG. 7 depicts a procedure of optimizing the number of states for a deterministic finite automaton according to the present invention.

In FIG. 7, an initial partition $\Pi$ obtains (n+1) states, including n accepting states ($F_1$, $F_2$, . . . , $F_n$) and one non-accepting state (at Step 701).

The partition $\Pi$ is further split into a new partition $\Pi_{new}$ until no more group can be split, i.e., a final partition $\Pi_{final}$ is obtained (Step 702).

A deterministic finite automaton M' having the optimized number of states is constructed from the final partition $\Pi_{final}$ (Step 703).

The number of states can be optimized in separate groups by thus constructing the deterministic finite automaton.

[Embodiment 4]

An example of a method of saving the number of states will be described by using the case of the embodiment 2. Referring to FIGS. 16 and 17, an initial partition $\Pi$ is constructed of a set of states with groups:

an accepting state $F_1$=State 2
an accepting state $F_2$=State 3, state 5
non-accepting state=State 1, State 4

A new partition $\Pi_{new}$ is prepared from the initial partition $\Pi$. The accepting state $F_1$ includes one state and, therefore, is left as it be. The accepting state $F_2$ is examined for transition of State 3 and State 5, respectively, on every character input. Both States go to State 3 on an input symbol "b" and results in "Mismatching" on any other character input. Consequently, the accepting state $F_2$ has no more groups need to split further.

The non-accepting state is examined. On the input symbol "a" , State 1 goes to State 2 (accepting state $F_1$) but State 4 goes to State 4 (the non-accepting state). Namely, two groups on the same input have different transitions (i.e., accepting state and non-accepting state), so they must be split further.

Thus, a new partition $\Pi_{new}$ is obtained, which includes:

accepting state $F_1$=State 2
accepting state $F_2$=State 3 and State 5
non-accepting state 1=State 1
non-accepting state 2=State 4

Since the partition has no more group needed to split further, it is considered as the final partition $\Pi_{final}$.

Figure 18:
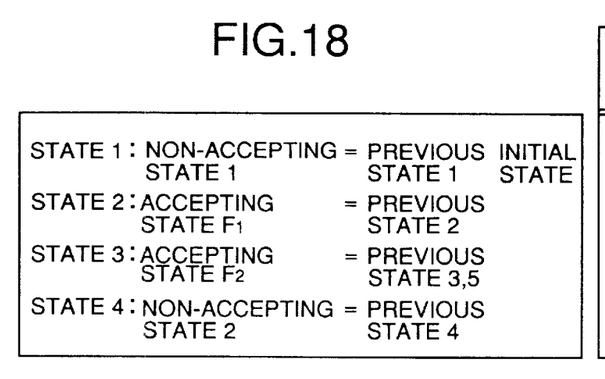
FIG. 18 is illustrative of a partition of a set of states after optimizing the number of states of an augmented regular expression according to the second embodiment of the present invention.

Next, any state in each group in $\Pi_{final}$ is chosen as a representative. In this instance, state 3 is chosen as representative for accepting state $F_2$ . The order is changed to construct a new state that is defined below. (An initial state is the representative for groups including an initial state of the original deterministic finite automaton.)

The definitions is as follows:

State 1=Non-accepting state 1=Original state 1=Initial state.

State 2=Accepting State $F_1$=Original State 2

State 3=Accepting State $F_2$=Original State 3

State 4=Non-accepting state 2=Original state 4

Figure 19:
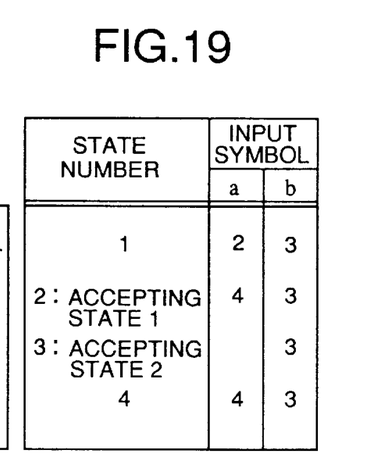
FIG. 19 is illustrative of a partition of a state transition table after optimizing the number of states of an augmented regular expression according to the second embodiment of the present invention.

According to the new states, the transition table is rewritten as shown in FIG. 19. The deterministic finite automaton thus constructed can distinguish the accepting state $F_1$ from the non-accepting state $F_2$ and has the optimized (reduced) number of states as compared with the original number of states (FIG. 17).

A means for providing programs and data necessary for performing any aspect of character and/or character-string retrieving methods according to the present invention is described below.

This means is supplied as a storage medium having stored programs and data recorded therein for executing the procedure of character and/or character-string retrieval according to the present invention. In practice, the storage medium may be of ROM (read-only memory), flash memory, floppy disc, hard disc, magneto-optical disc, CD-ROM and so on. The storage medium with necessary programs and data recorded therein may be widely spread on the market and makes easier the application of the character and/or character-string method according to the present invention.

Installation of the storage medium may create an effective character and/or character-string retrieving system in any kind of information processing devices (e.g., computers) which may retrieve characters and/or character-strings from a read document according to the programs and data stored in the storage medium.

The present invention is not only used for retrieving a word or matching a word pattern but also applicable as a deterministic finite automaton with a plurality of distinguishable accepting states.

The present invention provides a character and/or character-string retrieving method that can retrieve a plurality of different kinds of patterns at a time from once-read document data.

(1) The present invention offers the following advantages according to one aspect: retrieval of a plurality of patterns can be executed by distinguishing matched patterns from one another owing to having a plurality of accepting states for regular expressions desired to be distinguished.

(2) Another aspect of the present invention creates a character and/or character-string retrieving method which has a plurality of accepting states for regular expressions desired to be distinguished and can surely distinguish respective matched patterns when retrieving a plurality of patterns at a time. This method differs from the above-mentioned aspect by applying one kind of end-marker in common for states.

(3) Another aspect of the present invention provides an effective practical procedure of executing the method mentioned in any one of (1) and (2) above.

(4) A further aspect of the present invention optimizes the number of states for a deterministic finite automaton maintaining the feature of the invention to simultaneously retrieving a plurality of patterns at a time by distinguishing them from one another.

(5) Yet another aspect of the present invention provides an effective practical procedure of executing the method mentioned in (4) above.

(6) A further aspect of the present invention provides programs and data necessary for executing any one of the methods mentioned in (1) to (5) above as be recorded on a storage medium to be read in an information processing device such as a computer. Application of the recorded storage medium enables the computer to retrieve characters and/or character-strings in a read document according to the retrieval method of the present invention.

I claim:

1. A character and/or character-string retrieving method for simultaneously retrieving a plurality of specific patterns of characters and/or character-strings from objects to be searched, comprising:

preparing a syntax $((r_1)\#_1)|((r_2)\#_2)| \ldots |((r_n)\#_n)$ on the basis of an augmented regular expression $(r_1)\#_1$, $(r_2)\#_2 \ldots, (r_n)\#_n$ obtained by concatenating end-markers $\#_1, \#_2, \ldots \#_n$ to respective regular expressions $r_1, r_2, \ldots, r_n$, containing a plurality of characters and/or character-strings (2, . . . , n); and constructing a deterministic infinite automaton for simultaneously retrieving a plurality of specific patterns of characters and/or character-strings from objects to be searched by distinguishing each of the characters and/or character-strings contained in the plurality of regular expressions $r_1, r_2, \ldots r_n$ by means of each of the end-markers $\#_1, \#_2 \ldots \#_n$ attached thereto for representing accepting states 1, 2, . . . n of the regular expressions respectively.

2. A storage medium storing a program and data which are necessary for executing the character and/or character-string retrieving method defined claim 1 and readable therefrom by a computer.

3. A character and/or character-string retrieving method for simultaneously retrieving a plurality of specific patterns of characters and/or character-strings from objects to be searched, comprising:

preparing a syntax $((r_1)\#)|((r_2)\#)| \ldots |((r_n)\#)$ on the basis of an augmented regular expression $(r_1) \#, (r_2) \# \ldots,$ $(r_n)\#$ by concatenating an end-marker # to respective regular expressions $r_1, r_2, \ldots, r_n$, containing a plurality of characters and/or character-strings (2, . . . , n); and constructing a deterministic infinite automaton for simultaneously retrieving a plurality of specific patterns of characters and/or character-strings from objects to be searched by distinguishing each of the characters and/or the character-strings contained in the plurality of regular expressions $r_1, r_2, \ldots r_n$ by means of each of the end-markers # attached thereto for representing accepting states 1, 2, . . . n of the regular expressions respectively.

4. The character and/or character-string retrieving method as defined in claim 1 or claim 3, wherein the plurality of specific patterns of characters and/or character-strings contained in the plurality of regular expressions $r_1, r_2 \ldots r_n$ are used simultaneously as the objects to be searched by preparing a set of states {state 1, state 2 . . . } and a state-transition table on the set of states from syntax based on the augmented regular expression.

5. The character and/or character-string retrieving method as defined in claim 4, wherein a number of states is optimized by splitting the set of states into (n+1) groups including groups $(F_1, F_2, \ldots, F_n)$ corresponding to accepting states 1, 2, . . . , n and a group corresponding to non-accepting states other than accepting states.

6. The character and/or character-string retrieving method as defined in claim 5, wherein each of the (n+1) groups is split into subgroups until a state s in a group "a" has transition on a character and/or a character-string input M to a state in a group "b" and any other state t in the same group "a" has a transition on the same input M to a state in the same group "b" and a state-transition table is rewritten according to a partition obtained as an effect of the splitting.

7. A storage medium storing a program and data which are necessary for executing the character and/or character-string retrieving method defined in claim 6 and readable therefrom by a computer.

8. A storage medium storing a program and data which are necessary for executing the character and/or character-string retrieving method defined in claim 5 and readable therefrom by a computer.

9. A storage medium storing a program and data which are necessary for executing the character and/or character-string retrieving method defined in claim 4 and readable therefrom by a computer.

10. A storage medium storing a program and data which are necessary for executing the character and/or character-string retrieving method defined in claim 3 and readable therefrom by a computer.

11. An article of manufacture taking the form of a computer-readable medium for simultaneously retrieving a plurality of specific patterns of characters and/or character-strings from objects to be searched, the article of manufacture comprising:

a syntax source code segment for preparing a syntax $((r_1)\#_1)|((r_2)\#_2)| \ldots |((r_n)\#_n)$ on the basis of an augmented regular expression $(r_1)\#_1, (r_2)\#_2 \ldots, (r_n)\#_n$ obtained by concatenating end-markers $\#_1, \#_2, \ldots \#_n$ to respective regular expressions $r_1, r_2, \ldots r_n$ containing a plurality of characters and/or character-strings (2, ..., n); and an automaton source code segment for constructing a deterministic infinite automaton for simultaneously retrieving a plurality of specific patterns of characters and/or character-strings from objects to be searched by distinguishing each of the characters and/or the character-strings contained in the plurality of regular expressions $r_1, r_2, \ldots r_n$ by means of each of the end-markers $\#_1, \#_2 \ldots \#_n$ attached thereto for representing accepting states 1, 2, ... n of the regular expressions respectively.

12. An article of manufacture taking the form of a computer-readable medium for simultaneously retrieving a plurality of specific patterns of characters and/or character-strings from objects to be searched, the article of manufacture comprising:

a syntax source code segment for preparing a syntax $((r_1)\#)|((r_2)\#)| \ldots |((r_n)\#)$ on the basis of an augmented regular expression $(r_1) \#, (r_2) \# \ldots, (r_n)\#$ by concatenating an end-marker # to respective regular expressions $r_1, r_2, \ldots, r_n$ containing a plurality of characters and/or character-strings (2, ..., n); and an automaton source code segment for constructing a deterministic infinite automaton for simultaneously retrieving a plurality of specific patterns of characters and/or character-strings from objects to be searched by distinguishing each of the characters and/or the character-strings contained in the plurality of regular expressions $r_1, r_2, \ldots r_n$ by means of each of the end-markers # attached thereto for representing accepting states 1, 2, ... n of the regular expressions respectively.

13. The article of manufacture as defined in claim 11 or claim 12, wherein the plurality of specific patterns of characters and/or character-strings contained in the plurality of regular expressions $r_1, r_2 \ldots r_n$ are used simultaneously as the objects to be searched, the article of manufacture further comprising:

a state source code segment for preparing a set of states {state 1, state 2 ... } and a state-transition table on the set of states from syntax based on the augmented regular expression.

14. The article of manufacture as defined in claim 13, further comprising an optimization source code segment for optimizing a number of states by splitting the set of states into (n+1) groups including groups $(F_1, F_2, \ldots, F_n)$ corresponding to accepting states 1, 2, ..., n and a group corresponding to non-accepting states other than accepting states.

15. The article of manufacture as defined in claim 14, wherein each of the (n+1) groups is split into subgroups until a state s in a group "a" has transition on a character and/or character-string input M to a state in a group "b" and any other state t in the same group "a" has a transition on the same input M to a state in the same group "b" and a state-transition table is rewritten according to a partition obtained as an effect of the splitting.

* * * * *